(12) United States Patent
Richards et al.

(10) Patent No.: US 10,503,374 B1
(45) Date of Patent: Dec. 10, 2019

(54) PROVIDING CONTENT FOR BROADCAST BY A MESSAGING PLATFORM

(71) Applicant: Twitter, Inc., San Francisco, CA (US)

(72) Inventors: David Richards, Belmont, MA (US); George Oliver Young, Boston, MA (US); Noah Vihinen, Wenham, MA (US); Indranrita Deshmukh, Cambridge, MA (US); Scott Listfield, Somerville, MA (US); Joel Lunenfeld, Tiburon, CA (US)

(73) Assignee: Twitter, Inc., San Francisco, CA (US)

( * ) Notice: Subject to any disclaimer, the term of this patent is extended or adjusted under 35 U.S.C. 154(b) by 326 days.

(21) Appl. No.: 14/447,266

(22) Filed: Jul. 30, 2014

Related U.S. Application Data

(60) Provisional application No. 61/975,815, filed on Apr. 5, 2014.

(51) Int. Cl.
*G06F 3/0484* (2013.01)
*G06F 3/0481* (2013.01)
*H04L 29/08* (2006.01)

(52) U.S. Cl.
CPC ........ *G06F 3/04842* (2013.01); *G06F 3/0481* (2013.01); *H04L 67/18* (2013.01)

(58) Field of Classification Search
CPC ........ H04L 12/581; H04L 67/18; G06Q 10/10
USPC ................................................. 715/752, 753
See application file for complete search history.

(56) References Cited

U.S. PATENT DOCUMENTS

| | | | |
|---|---|---|---|
| 8,185,558 B1* | 5/2012 | Narayanan | H04W 4/21 707/798 |
| 8,601,019 B1* | 12/2013 | Weininger | G06F 16/90324 707/769 |
| 9,582,503 B2* | 2/2017 | Hurst | G06F 17/241 |
| 2007/0061242 A1* | 3/2007 | Ramer | G06Q 10/10 705/37 |
| 2010/0241718 A1* | 9/2010 | Rasmussen | G06Q 10/107 709/206 |
| 2010/0251086 A1* | 9/2010 | Haumont | G06F 17/2235 715/205 |
| 2011/0307469 A1* | 12/2011 | Ghosh | G06F 17/30389 707/711 |
| 2012/0278164 A1* | 11/2012 | Spivack | G06Q 10/10 705/14.52 |
| 2014/0040244 A1* | 2/2014 | Rubinstein | G06Q 50/01 707/722 |
| 2014/0095419 A1* | 4/2014 | Gandhi | G06N 5/02 706/46 |
| 2014/0157145 A1* | 6/2014 | Bush | G06Q 50/01 715/745 |

(Continued)

*Primary Examiner* — Joy M Weber
(74) *Attorney, Agent, or Firm* — Fish & Richardson P.C.

(57) ABSTRACT

A system and method for providing content for broadcast by a messaging platform, including: receiving an identifier selected by a user of a client computing device during composition of a message; identifying a content provider associated with the identifier; providing, by a computer processor, a set of content items of the content provider for presentation by the client computing device, wherein the user of the client computing device selects a content item from the presented set of content items; and broadcasting the message with a reference to the selected content item to a plurality of accounts of the messaging platform.

20 Claims, 10 Drawing Sheets

(56) References Cited

U.S. PATENT DOCUMENTS

| | | | |
|---|---|---|---|
| 2014/0164994 A1* | 6/2014 | Myslinski | G06F 1/163 |
| | | | 715/808 |
| 2014/0172565 A1* | 6/2014 | Alon | G06Q 30/0275 |
| | | | 705/14.54 |
| 2014/0244619 A1* | 8/2014 | Doroshenko | G06F 16/3325 |
| | | | 707/722 |

* cited by examiner

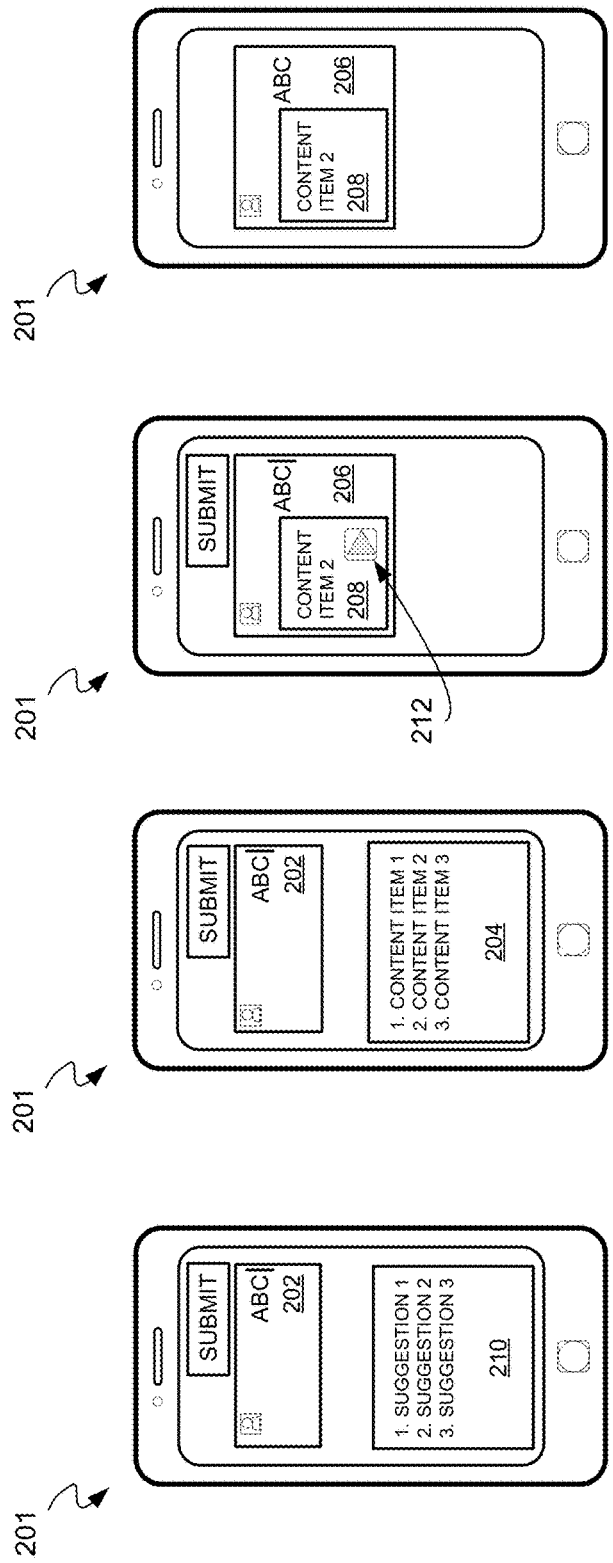

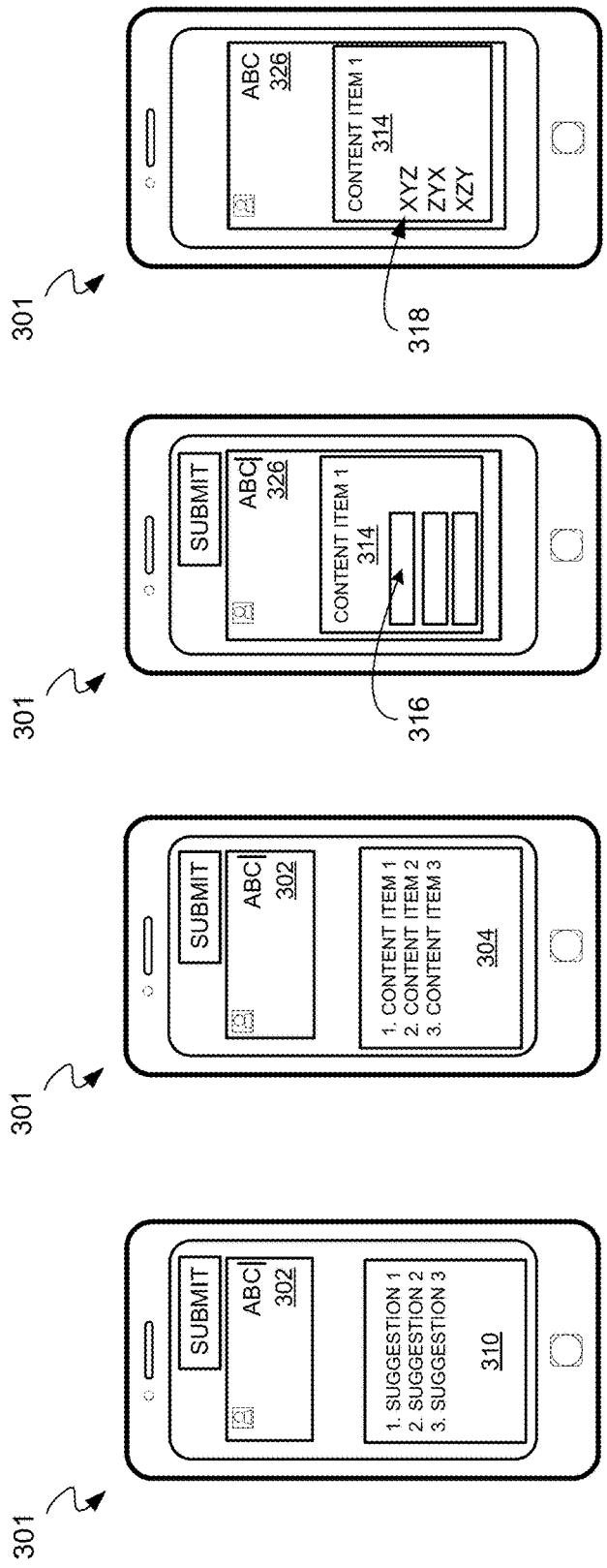

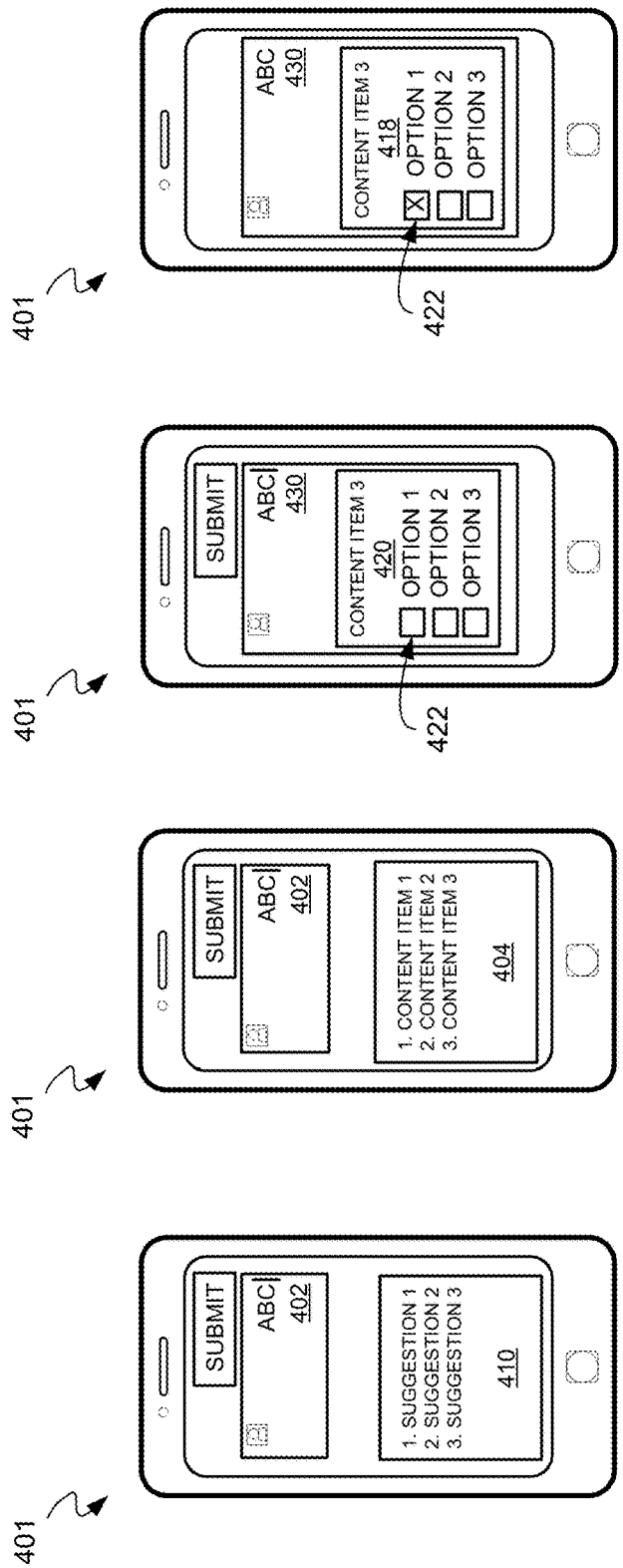

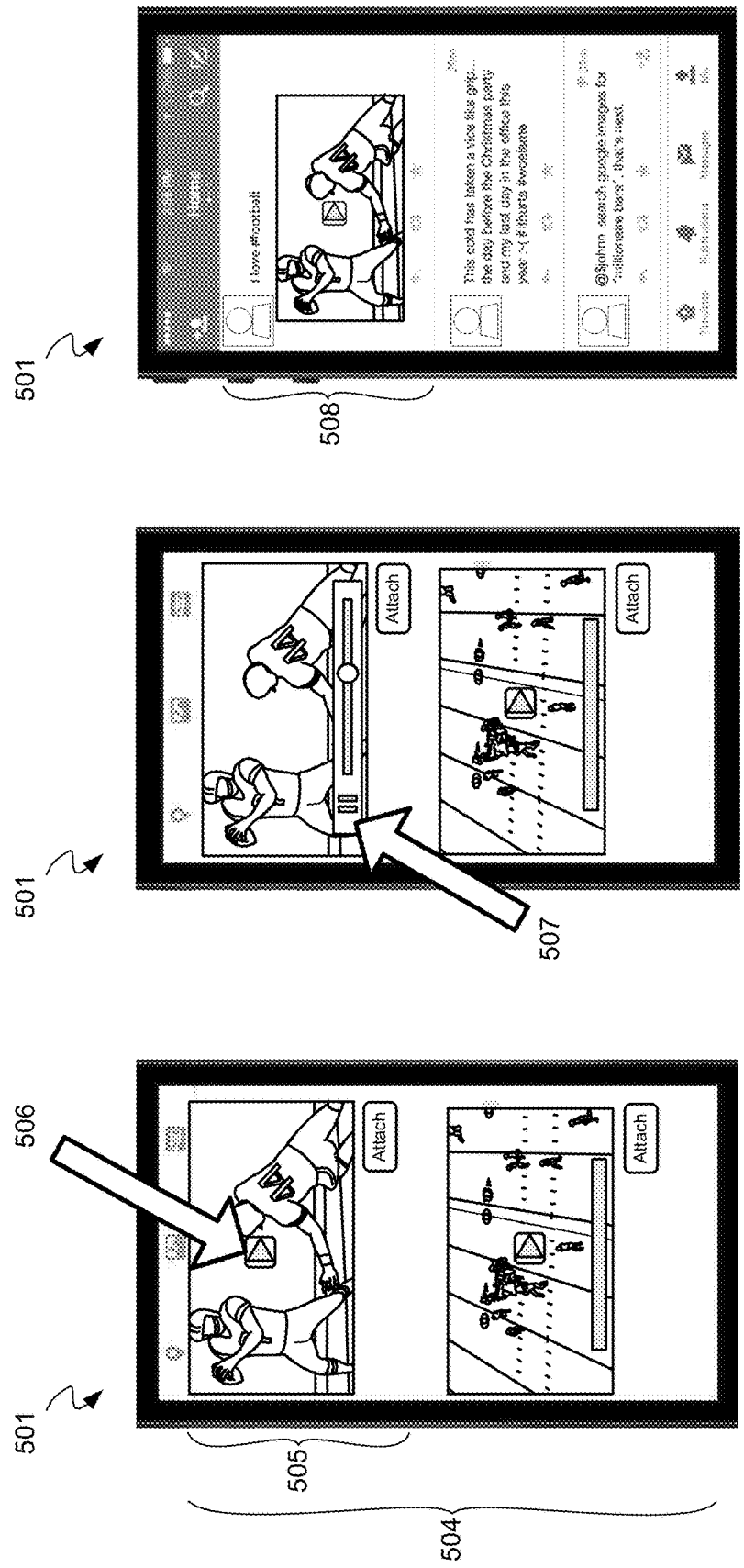

PROVIDING CONTENT FOR BROADCAST BY A MESSAGING PLATFORM

CROSS-REFERENCE TO RELATED APPLICATIONS

This application claims the benefit of U.S. Provisional Application No. 61/975,815, filed on Apr. 5, 2014 and entitled "PROVIDING CONTENT FOR BROADCAST BY A MESSAGING PLATFORM". Application No. 61/975,815 is incorporated by reference herein, in its entirety, for all purposes.

BACKGROUND

The development and proliferation of sophisticated mobile computing devices such as smart phones and tablets have likely contributed to a sudden rise in the usage of social networking messaging platforms and applications. With increasingly powerful computing devices and extensive mobile networks, social networking has become available at any time and almost everywhere. Popular messaging platforms often provide functionality for users to draft and send messages to other users. Other common features include the ability to "post" messages that are visible to one or more identified other users of the platform and the ability to associate the messages with one or more identifiers.

SUMMARY

In general, in one aspect, the invention relates to a system for providing content for broadcast by a messaging platform. The system can include: a computer processor; a content promotion module executing on the computer processor and configured to enable the computer processor to: receive an identifier selected by a user of a client computing device during composition of a message; identify a content provider associated with the identifier; provide a set of content items of the content provider for presentation by the client computing device, wherein the user of the client computing device selects a content item from the presented set of content items; and broadcast the message with a reference to the selected content item to a plurality of accounts of the messaging platform.

In general, in one aspect, the invention relates to a method for providing content for broadcast by a messaging platform. The method can include: receiving an identifier selected by a user of a client computing device during composition of a message; identifying a content provider associated with the identifier; providing, by a computer processor, a set of content items of the content provider for presentation by the client computing device, wherein the user of the client computing device selects a content item from the presented set of content items; and broadcasting the message with a reference to the selected content item to a plurality of accounts of the messaging platform.

In general, in one aspect, the invention relates to a method for presenting content. The method can include: detecting, by a client computing device, an identifier selected during composition of a message by a user of the client computing device; providing, by the client computing device, the identifier to a messaging platform; receiving, by the client computing device and from the messaging platform, a set of content items provided by a content provider, wherein the identifier is reserved for the content provider; and presenting, by the client computing device, the set of content items during composition of the message.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 2A-2D show example user interfaces in accordance with one or more embodiments of the invention.

FIGS. 3A-3D show example user interfaces in accordance with one or more embodiments of the invention.

FIGS. 4A-4D show example user interfaces in accordance with one or more embodiments of the invention.

FIGS. 5A-5E show example user interfaces in accordance with one or more embodiments of the invention.

DETAILED DESCRIPTION

Figure 1A:
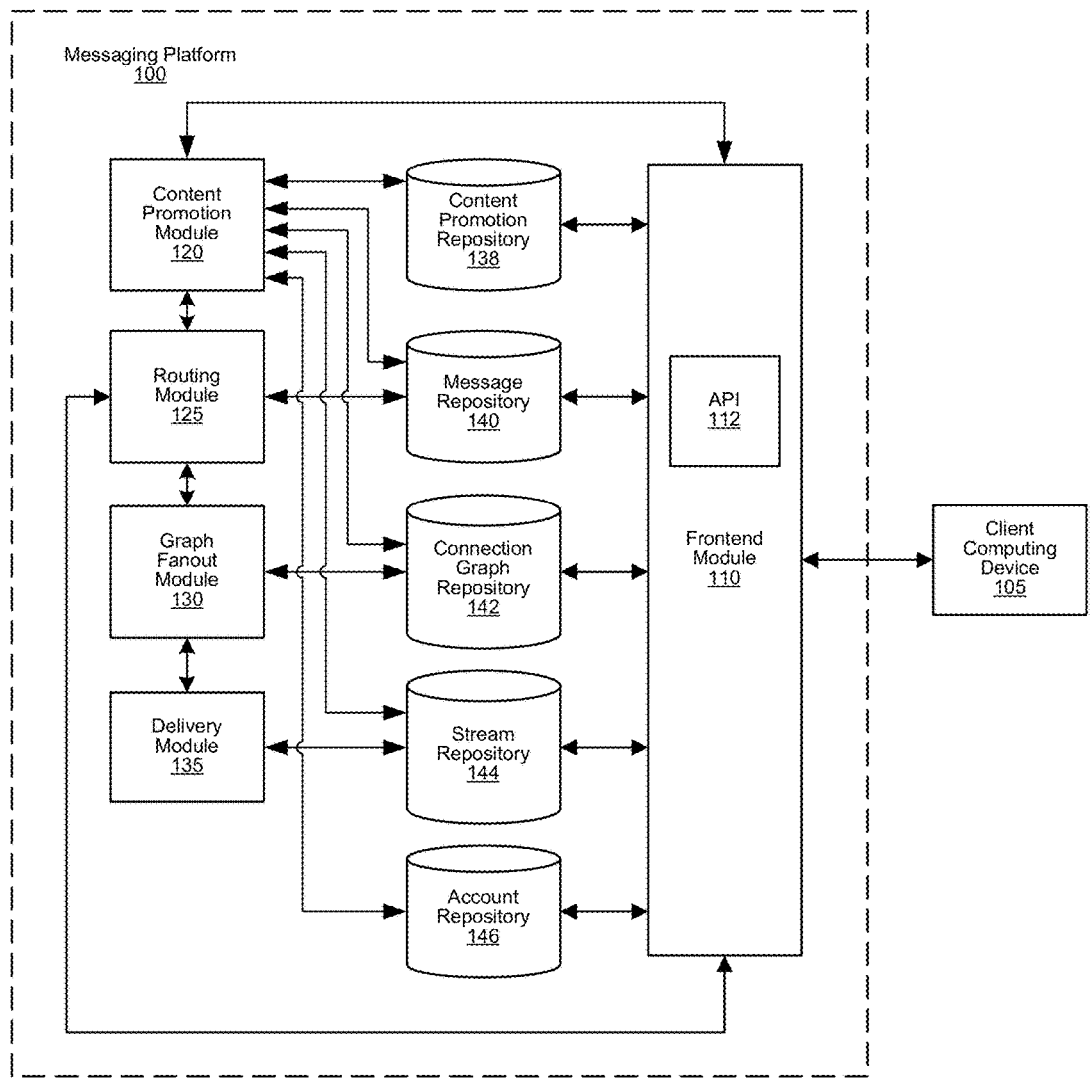
FIG. 1A shows a schematic diagram of a system, in accordance with one or more embodiments of the invention.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for providing content for broadcast by a messaging platform. An identifier selected by a user of a client computing device is received during composition of a message. A content provider associated with the identifier is identified. A set of content items of the content provider are provided for presentation by the client computing device, and the message is broadcasted with a reference to a content item selected by the user of the client computing device.

FIG. 1A shows a messaging platform 100 and a client computing device 105 in accordance with one or more embodiments. As shown in FIG. 1A, the messaging platform 100 has multiple components including a frontend module 110 with an application programming interface (API) 112, a content promotion module 120, a routing module 125, a graph fanout module 130, a delivery module 135, a content promotion repository 138, a message repository 140, a connection graph repository 142, a stream repository 144, and an account repository 146. Various components of the messaging platform 100 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, the messaging platform 100 is a platform for facilitating real-time communication between one or more entities. For example, the messaging platform 100 may store millions of accounts of individuals, businesses, and/or other entities (e.g., pseudonym accounts, novelty accounts, etc.). One or more users of each account may use the messaging platform 100 to send messages to other accounts inside and/or outside of the messaging platform 100. The messaging platform 100 may be configured to enable users to communicate in "real-time", i.e., to converse with other users with a minimal delay and to conduct a conversation with one or more other users during concurrent sessions. In other words, the messaging platform 100 may allow a user to broadcast messages and may display the messages to one or more other users within a reasonable time frame so as to facilitate a live conversation between the users. Recipients of a message may have a predefined graph relationship with an account of the user broadcasting the message. In one or more embodiments, the user is not an account holder or is not logged in to an account of the messaging platform 100. In this case, the messaging platform 100 may be configured to allow the user to broadcast messages and/or to utilize other functionality of the messaging platform 100 by associating the user with a temporary account or identifier.

In one or more embodiments, the content promotion module 120 includes functionality to identify a content provider associated with an identifier, provide a set of content items of the content provider for presentation by the client computing device 105, and allow a user of the client computing device 105 to select a content item from the presented set of content items. Relationships between accounts of the messaging platform 100 can be represented by a connection graph.

Figure 1B:
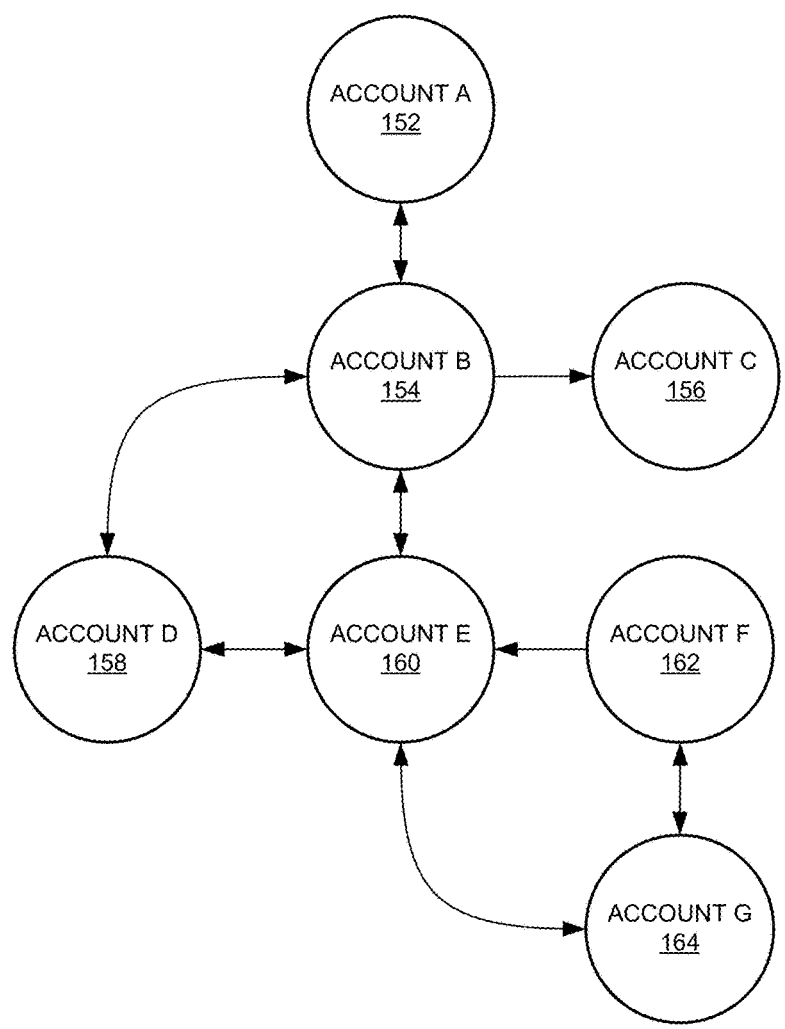
FIG. 1B shows an example depiction of a connection graph in accordance with one or more embodiments of the invention.

FIG. 1B shows an example depiction of a connection graph 150 in accordance with one or more embodiments. In one or more embodiments, the connection graph repository 142 is configured to store one or more connection graphs. As shown in FIG. 1B, the connection graph 150 includes multiple components including nodes representing accounts of the messaging platform 100 (i.e., Account A 152, Account B 154, Account C 156, Account D 158, Account E 160, Account F 162, Account G 164) and edges connecting the various nodes.

The connection graph 150 is a data structure representing relationships (i.e., connections) between one or more accounts. The connection graph 150 represents accounts as nodes and relationships as edges connecting one or more nodes. A relationship may refer to any association between the accounts (e.g., following, friending, subscribing, tracking, liking, tagging, and/or etc.). The edges of the connection graph 150 may be directed and/or undirected based on the type of relationship (e.g., bidirectional, unidirectional), in accordance with various embodiments.

Many messaging platforms include functionality to broadcast streams of messages to one or more accounts based at least partially on a connection graph representing relationships between those accounts (see FIG. 1B). A stream may be a dynamic list of messages associated with one or more accounts or can reflect any arbitrary organization of messages that is advantageous for the user of an account. For purposes of this disclosure, a "message" can include a user authored message and/or any content (multimedia, text, etc.) broadcasted/posted by an account of a messaging platform.

Returning to FIG. 1A, in one or more embodiments, the content promotion module 120 includes functionality to receive an identifier selected by a user of the client computing device 105 during composition of a message. In one or more embodiments, the identifier may include a hashtag, a handle, and/or a button on a profile page. A hashtag may be a reference used to associate the message with a topic or category. A handle may be a reference to a user account. In one or more embodiments, the handle may be preceded by a symbol to identify the characters following the symbol as a handle. A button on a profile page may be provided to tag the message with an identifier. In one or more embodiments, a user may perform an action on the button and provide an identifier to associate with the message.

In one or more embodiments, the client computing device 105 includes functionality to provide suggestions for an identifier using keywords from the message. The client computing device 105 may receive candidate suggestions for an identifier from the messaging platform 100. For example, the content promotion module 120 of the messaging platform 100 may identify keywords based on portions of the message received during composition of the message. Keywords may be identified based on language analysis, comparison to a store of keywords, and/or a known prefix for an identifier. The content promotion module 120 may associate the keywords with candidate identifiers using the content promotion repository 138. In one or more embodiments, the content promotion module 120 may associate one or more words of the message to candidate identifiers using the content promotion repository 138.

In one or more embodiments, the client computing device 105 includes functionality to detect an identifier selected during composition of a message by a user of the client computing device 105. The selected identifier may be detected based on the use of a known prefix, string of characters, or user interface element. The client computing device 105 may identify the use of a known prefix, such as a hashtag, to detect an identifier selected by the user of the client computing device 105. The client computing device 105 may identify a string of characters, such as a handle or a favorite identifier, to detect an identifier selected by the user of the client computing device 105. The client computing device 105 may identify the use of a user interface element, such as a selection from a list of presented identifier suggestions, to detect an identifier selected by the user of the client computing device 105.

The client computing device 105 may continuously monitor a composition of a message, monitor the composition at predefined time intervals, and/or monitor the composition after each character input. In one or more embodiments, the client computing device 105 may include functionality to provide the identifier to the messaging platform 100. For example, the client computing device 105 may provide the identifier to the content promotion module 120.

In one or more embodiments, the content promotion module 120 includes functionality to log the selections of the user and/or use of selected content items by the user. The logged selections may be used by a monetization module (not shown) to calculate a fee. For example, the monetization module may include functionality to use one or more monetization criteria to calculate a fee to be charged to a content provider. Monetization criteria may include a number of selections of a content item by users, a percentage of revenue earned as a result of presenting the content item for selection or broadcasting the content item in a message, an amount of time spent by users while using the content item, and/or a fixed fee (e.g., a one-time fixed fee for associating the content item with the identifier for presentation of the content item when a user includes the identifier in a draft message).

The monetization module may receive a request to associate an identifier with a content provider. The monetization module may include functionality to calculate or identify a fee for associating the identifier with the content provider. The fee for associating the identifier with the content provider may include a fee whether or not content from the content provider has been provided to a client computing device. The monetization module may calculate a fee for each upload action of a content item by the content provider, by the content provider, to be associated with the identifier. Similarly, the fee for each upload action of a content item may be calculated whether or not the content item has been provided to a client computing device.

The monetization module may receive a request to promote a content item and/or a content provider. The monetization module may include functionality to adjust metrics of one or more ranking criteria used by the content promotion module 120. The ranking criteria may include metrics for each content item or content provider, such as a recency of the content item, a frequency of viewing the content item(s) of the content provider by users of the messaging platform 100, engagement with the content item or content provider by users of the messaging platform 100, a geographical proximity between a location of the client computing device 105 and a geographical association of the content item or content provider, a location associated with the content item or content provider, ownership of the identifier, a relevance of the content item or content provider, and/or a promotion metric of the content item or content provider.

The adjustment of the metrics of the ranking criteria may result in promoted content items and/or content providers being ranked higher in a list of content items provided to a client computing device. For example, the monetization module may adjust the relevance of the content item and/or content provider to boost the ranking of the content item and/or content provider that is being promoted. The monetization module may utilize a promotion metric to promote the content item and/or content provider. Utilizing the promotion metric may achieve the desired promotion without adjusting other metrics of the ranking criteria.

The monetization module may include functionality to calculate a fee for promoting the content item and/or the content provider. The fee for promoting content items and/or content providers may include a fee whether or not content has been provided to a client computing device. For example, the fee for promoting content items and/or content providers may include a flat fee or a baseline fee. The flat fee and/or the baseline fee may be charged for adjusting the promotion metric. A flat fee may remain the same regardless of whether the content has been provided to a client computing device. A baseline fee may provide a minimum fee regardless of whether the content has been provided to a client computing device and additional fees depending on other metrics, such as a frequency of viewing the content item or content items of the content provider by users of the messaging platform 100.

In one or more embodiments, the monetization module may include functionality to provide identifier suggestions to content providers. The monetization module may provide identifier suggestions by determining a monetizing potential metric. The monetizing potential metric may be determined using data from the messaging platform 100, such as the frequency or recency of messages broadcasted by users of the messaging platform 100 including certain identifiers, the frequency or recency of messages broadcasted including certain content items of the content provider, and/or a combination of an identifier and content items of the content provider. The monetization module may include functionality to use the monetizing potential metric to present potential monetization criteria for evaluation by content providers. The potential monetization criteria may include a number of projected selections of a content item by users, projected revenue earned as a result of presenting the content item for selection or broadcasting the content item in a message, and/or an amount of time spent by users while using the content item.

In one or more embodiments, the content promotion module 120 includes functionality to identify a content provider associated with the identifier. The content promotion module 120 may use the content promotion repository 138 to associate an identifier detected during composition of a message to a set of content providers of the content promotion repository 138. The content promotion repository 138 may include a content promotion store in which content providers and identifiers are stored. The content promotion store may include associations between identifiers and content providers. The content provider may be a person, service, company, or any other source of content. The content provider may provide the messaging platform 100 with content or may provide information such that the messaging platform 100 can reference the content provided by the content provider. In one or more embodiments, the identifier may be reserved for the content provider. When an identifier is reserved for the content provider, the content provider may be the primary source or the only source of content for the reserved identifier. An identifier may be reserved by the messaging platform 100 by a variety of mechanisms including manually reserving, facilitating an auction, and/or using ranking criteria.

In one or more embodiments, the content promotion module 120 includes functionality to facilitate an auction for the identifier. The auction may result in a "winning" content provider. The winning content provider may be a top bidder of the auction. It will be understood that "winning" as used herein refers to a result of the auction. Other content providers that are not winning content providers may also be given certain levels of association with the identifier, preferences, and rankings as a winning or top bidder content provider (e.g., based on the auction results or other criteria). For example, content of other content providers that are not the top bidder may be included in a list of content presented to a user of the messaging platform 100 alongside content of the winning content provider, in proportion to their auction ranking resulting from their bids. The auction may result in content items of the winning content provider and/or the winning content providers being associated with the identifier defined by the messaging platform 100, such as an exclusive association, a shared association, or a ranking preference. In one or more embodiments, the content promotion module 120 includes functionality to receive a set of bids from a set of content providers in response to the auction. The bids may be made based on monetary amounts. The set of content providers may include the content provider.

In one or more embodiments, the content promotion module 120 includes functionality to determine, based on a set of auction criteria, that the content provider is a winner of the auction. In one or more embodiments, the set of auction criteria includes one or more relevance criteria based on a relevance of each content provider to the identifier and one or more monetary criteria based on the bid provided by each of the set of content providers.

The relevance criteria may provide an evaluation of the relevance of each content provider to the identifier. The relevance of each content provider to the identifier may be determined by automatically or manually determining a relevance between the content provider and the identifier using any known metrics. For example, the relevance between the content provider and the identifier may be determined by evaluating geographic relevance, subject matter relevance, or previous association of the identifier to a content provider by users of the messaging platform 100. Geographic relevance may be used as part of the relevance criteria when the identifier has a geographic significance, such as a local sports team. Subject matter relevance may be used as part of the relevance criteria when the identifier has a subject matter significance, such as a consumer product. Previous association of the identifier to a content provider by users of the messaging platform may be used as part of the relevance criteria when the identifier may have an established association by users of the messaging platform. The established association may be determined by performing analytics to determine whether users use the identifier to reference a certain content provider.

The monetary criteria may be used to evaluate bids provided by each of the set of content providers. In some examples, the bids may include an offer to provide a fee, such as a monetary payment. In some examples, the bids may include information for use in determining the relevance criteria, such as information relevant to determining a geographic association with the identifier. For example, a local sports team may provide information identifying its association to an identifier referencing its name in a certain locality. In some examples, a content provider may provide information identifying its global association to an identifier. A global association may indicate a global relevance in equal or varying degrees depending on geographic location. For example, an identifier referencing a concert tour may be relevant globally, but more relevant to users in countries where shows of the concert tour are scheduled to take place. An identifier referencing a global event may be equally relevant globally.

In one or more embodiments, the auction for an identifier may provide the winning content provider with an exclusive association with the identifier, a shared association with the identifier, or a ranking preference. An exclusive association with the identifier may or may not include control over the set of content items provided by the content promotion module 120 to the client computing device 105. When an exclusive association with the identifier is provided, the set of content items provided by the content promotion module 120 to the client computing device 105 may be associated with the winning content provider. In one or more embodiments, a content provider with an exclusive association with the identifier may select the set of content items provided to the client computing device 105. Alternatively, in one or more embodiments, the content promotion module 120 may select a set of content items to provide to the client computing device 105. In one or more embodiments, the content promotion module 120 may select a set of content items of the content provider with an exclusive association with the identifier. In one or more embodiments, the set of content items of the content provider provided to the client computing device 105 may be a subset of a set of content items provided by the winning content provider to the content promotion module 120. In one or more embodiments, the content promotion module 120 may include functionality to modify content items.

Modification of content items may include clipping a video, adding a watermark, applying a filter, or other known processing functionalities. For example, a logo of a sponsoring event or organization may be overlaid upon one or more content items in exchange for a promotion fee paid by the organization.

Similarly, the auction for an identifier may provide a set of winning content providers with a shared association with the identifier. An shared association may or may not provide control over the set of content items to the set of winning content providers. When a shared association is provided, the set of content items provided to the client computing device 105 may be associated with the set of winning content providers. In one or more embodiments, winning content providers with a shared association with the identifier may select the set of content items provided to the client computing device 105. Alternatively, in one or more embodiments, the content promotion module 120 may select a set of content items to provide to the client computing device 105. In one or more embodiments, the content promotion module 120 may select a set of content items of winning content providers with a shared association with the identifier. In one or more embodiments, the set of content items of the winning content providers provided to the client computing device 105 may be a subset of a set of content items provided by the winning content providers to the content promotion module 120. In one or more embodiments, the content promotion module 120 may include functionality to modify content items. Modification of content items may include clipping a video, adding a watermark, applying a filter, or other known processing functionalities.

In one or more embodiments, the winning content provider and/or content items associated with the winning content provider may be included in ranking criteria for presentation of the set of content items. The inclusion in the ranking area may be used to provide the winning content provider with a ranking preference relative to other content providers.

FIGS. 2A-2D show example user interfaces in accordance with one or more embodiments. A client computing device 201 of FIGS. 2A-2D may be the same as or similar to the client computing device 105 of FIG. 1A. In one or more embodiments, the content promotion module 120 includes functionality to provide a set of content items 204 of one or more content providers for presentation by the client computing device 201. For example, the content promotion module 120 may receive the set of content items 204 from the content promotion repository 138, and transmit the set of content items 204 to the client computing device 201. The content promotion repository 138 may store content items of the content provider. Alternatively, the content promotion module 120 may receive the set of content items 204 from an external source (e.g., a server of the content provider). In one or more embodiments, the client computing device 201 includes functionality to receive a set of content items from the messaging platform 100, for example from the content promotion repository 138. In one or more embodiments, the content items may be provided by a content provider. In one or more embodiments, the content items may be provided by a third party. For example, the content items may be dynamically fetched from an ad exchange, advertiser, ad network, or other third party content provider. In this example, the exclusive or shared association can be determined without the messaging platform 100 obtaining or identifying associated content items. The content items can then be fetched in real time, either directly from the content provider to the client device (without routing through the messaging platform 100) or otherwise. Alternatively, in another example, a source of the content items (e.g., a URL) can be defined in advance and stored in the content promotion repository 138, though the actual content items may not be obtained until requested (and are thus controlled by the content provider). In one or more embodiments, the set of content items 204 include images, video, audio, and/or text. It will be understood that the set of content items 204 may include any combination of images, video, audio, and text. Moreover, the set of content items 204 may include other types of content items.

In one or more embodiments, as shown in FIG. 2A, the client computing device 201 includes functionality to receive a composition of a message in a message composition user interface element 202. In one or more embodiments, the client computing device 201 includes functionality to present an identifier-suggestion user interface element 210 configured to provide a set of identifier suggestions during composition of the message. The identifier suggestions may be selected based on a predictive association, related identifiers, and/or other relevant identifiers. The user may select a suggested identifier to include the suggested identifier within the message. For example, the client computing device 201 may send the contents of a message, while it is being composed by a user, to the messaging platform 100.

The messaging platform 100 may include functionality to receive the contents of the message from the client computing device 201 and determine identifier suggestions to present to the client computing device 201. The messaging platform 100 may include functionality to identify keywords in the content of the message and match the keywords to a database of identifiers stored within the messaging platform 100. The messaging platform 100 may include functionality to match the contents of the message to promoted identifiers. In some examples, the messaging platform 100 may use the content promotion module 120 to access a database of promoted identifiers and match the contents of the message to one or more promoted identifiers. Promoted content may include identifiers associated with winning content providers. For example, a local sports team may win an auction to associate a set of keywords or media to identifiers associated with the local sports team. Thus, as a user composes a message including any of the set of keywords or media, the messaging platform 100 may receive the message and match the contents of the message to promoted identifiers associated with the local sports team. In some examples, the messaging platform 100 may include functionality to determine other identifiers relevant to promoted identifiers. The other identifiers relevant to promoted identifiers may also be associated with the winning content providers. Thus, in the previous local sports team example, other identifiers relevant to the promoted identifiers may also be associated with the local sports team. The messaging platform 100 may include functionality to generate identifier suggestions including promoted identifiers, unpromoted identifiers, or combinations thereof that were matched to the keywords or media. The messaging platform 100 may include functionality to transmit the identifier suggestions to the client computing device 201. A variety of methods for suggesting identifiers, such as typeahead or text autocomplete functionality, can be used in accordance with various embodiments.

The client computing device 201 may receive, from the messaging platform 100, identifier suggestions based partially or fully on the contents of the message being composed. Accordingly, as the user composes a message, the client computing device 201 may display a drop-down menu listing selectable suggestions of known identifiers based on at least a portion of the message composed by the user. In some examples, the suggestions of known identifiers may include promoted identifiers. In some examples, the suggestions of known identifiers may include unpromoted identifiers. In some examples, indirectly promoted identifiers may be included in the suggestions of known identifiers. Indirectly promoted identifiers may include identifiers determined to be relevant to a promoted identifier included in the suggestions of known identifiers. The user may select a promoted identifier, an indirectly promoted identifier, or an unpromoted identifier from the drop-down menu listing selectable suggestions of known identifiers.

In one or more embodiments, as shown in FIG. 2B, the set of content items 204 may be presented in a user interface element concurrently with a message composition user interface element 202. While the message is being composed, the set of content items 204 may change based on the content of the message. In one or more embodiments, the user interface element is a drawer, a menu, a hoverbox, a slideshow, a map, a survey form, a questionnaire form, a webpage, a login page, or an input form. The user interface element may include functionality to allow the user to interact with the user interface element. For example, the user interface may include a preview element that allows previewing of the content, a drag and drop element that allows attachment of a file, a move element that allows moving of the user interface element, or form fields that may receive user input. The set of content items 204 may include promoted content items, indirectly promoted content items, and/or unpromoted content items.

In one or more embodiments, the user of the client computing device 201 selects a content item 208 from the presented set of content items 204. In one or more embodiments, the selected content item 208 may include photo, video, audio, or other types of multimedia. In one or more embodiments, as shown in FIG. 2C, the client computing device 201 includes functionality to include the selected content item 208 in a new message 206. In one or more embodiments, the client computing device 201 includes functionality to preview the selected content item 208 using a preview user interface control element 212. The preview user interface control element 212 may be presented concurrently during composition of a message. In one or more embodiments, the preview includes a display, playback, and/or output of the one or more content items. As shown in FIG. 2C, the client computing device 201 includes functionality to submit the new message 206 to the messaging platform 100. As shown in FIG. 2D, the client computing device 201 further includes functionality to receive new messages broadcasted from the messaging platform 100.

FIGS. 3A-3D show example user interfaces in accordance with one or more embodiments. A client computing device 301 of FIGS. 3A-3D may be the same as or similar to the client computing device 105 of FIG. 1A and the client computing device 201 of FIGS. 2A-2D. In one or more embodiments, the content promotion module 120 includes functionality to provide a set of content items 304 of the content provider for presentation by the client computing device 301. For example, the content promotion module 120 may receive the set of content items 304 from the content promotion repository 138, and transmit the set of content items 304 to the client computing device 301. The content promotion repository 138 may store content items of the content provider. Alternatively, the content promotion module 120 may receive the set of content items 304 from an external source (e.g., a server of the content provider). In one or more embodiments, the client computing device 301 includes functionality to receive a set of content items from the messaging platform 100, for example from the content promotion repository 138. In one or more embodiments, the content items may be provided by a content provider. In one or more embodiments, the set of content items 304 include images, video, audio, and/or text. It will be understood that the set of content items 304 may include any combination of images, video, audio, and text. Moreover, the set of content items 304 may include other types of content items.

In one or more embodiments, as shown in FIG. 3A, the client computing device 301 includes functionality to receive a composition of a message in a message composition user interface element 302. In one or more embodiments, the client computing device 301 includes functionality to present an identifier-suggestion user interface element 310 configured to provide a set of identifier suggestions during composition of the message. The identifier suggestions may be selected based on a predictive association, related identifiers, and/or other relevant identifiers. The user may select a suggested identifier to include the suggested identifier within the message.

In one or more embodiments, as shown in FIG. 3C, the client computing device 301 includes functionality to select a content item 314 including a form field from the set of content items 304 presented in the user interface element shown in FIG. 3B. The selected content item 314 may be included in a new message 326. In one or more embodiments, the client computing device 301 includes functionality to provide a form field user interface element 316. The form field user interface element 316 may include one or more form fields that a user may select to enter data. The data may include alphanumeric strings, numerical data, and/or references to files to be attached. In one or more embodiments, as shown in FIG. 3C, the client computing device 301 may include functionality to submit the new message 326 to the messaging platform 100. In one or more embodiments, as shown in FIG. 3D, the client computing device 301 may include functionality to receive the new message 326 broadcasted from the messaging platform 100.

FIGS. 4A-4D show example user interfaces in accordance with one or more embodiments. A client computing device 401 of FIGS. 4A-4D may be the same as or similar to the client computing device 105 of FIG. 1A, the client computing device 201 of FIGS. 2A-2D, and the client computing device 301 of FIGS. 3A-3D. In one or more embodiments, the content promotion module 120 includes functionality to provide a set of content items 404 of the content provider for presentation by the client computing device 401. For example, the content promotion module 120 may receive the set of content items 404 from the content promotion repository 138, and transmit the set of content items 404 to the client computing device 401. The content promotion repository 138 may store content items of the content provider. Alternatively, the content promotion module 120 may receive the set of content items 404 from an external source (e.g., a server of the content provider). In one or more embodiments, the client computing device 401 includes functionality to receive a set of content items from the messaging platform 100, for example from the content promotion repository 138. In one or more embodiments, the content items may be provided by a content provider. In one or more embodiments, the set of content items 404 include images, video, audio, and/or text. It will be understood that the set of content items 404 may include any combination of images, video, audio, and text. Moreover, the set of content items 404 may include other types of content items.

In one or more embodiments, as shown in FIG. 4A, the client computing device 401 includes functionality to receive a composition of a message in a message composition user interface element 402. In one or more embodiments, the client computing device 401 includes functionality to present an identifier-suggestion user interface element 410 configured to provide a set of identifier suggestions during composition of the message. The identifier suggestions may be selected based on a predictive association, related identifiers, and/or other relevant identifiers. The user may select a suggested identifier to include the suggested identifier within the message.

In one or more embodiments, as shown in FIG. 4C, during composition of a new message, the client computing device 401 includes functionality to select a content item 420 including a voting user interface element 422 from the set of content items 404 presented in the user interface element shown in FIG. 4B. The selected content item 420 including the voting user interface element 422 may be included in a new message 430. In one or more embodiments, the client computing device 401 includes functionality to provide the voting user interface element 422. The voting user interface element 422 may include one or more voting boxes that a user may select to provide a vote. The vote may correspond to multiple options presented to the user. In one or more embodiments, as shown in FIG. 4D, the client computing device 401 may include functionality to submit the new message 430 to the messaging platform 100. In one or more embodiments, as shown in FIG. 4D, the client computing device 401 may include functionality to receive the new message 430 broadcasted from the messaging platform 100. In one or more embodiments, the messaging platform 100 may include functionality to broadcast the new message 430 to other client computing devices of the messaging platform 100.

In one or more embodiments, the content promotion module 120 may include functionality to promote content, messages, and/or users. For example, a user of the client computing device 201 may include or select an identifier during composition of a message. In response to the inclusion or selection of the identifier, the content promotion module 120 may provide a set of content items of the content provider for presentation, thereby promoting the content provider and/or content items. In another example, a user of the client computing device 201 may include an identifier during composition of a message, select a content item from a set of content items provided by the messaging platform 100, broadcast the message to users of the messaging platform 100. The content promotion module 120 may promote the message, the selected content item, or the content provider itself by including the message in the message stream of more users than a message without the selected item and/or indicating to the content provider that the content item was selected, thereby allowing the content provider to "like" or "share" the message for further promotion. Promoting messages of the content provider or the content provider itself may include adjusting metrics of the ranking criteria to present messages or content items of the content provider higher in a list of messages broadcast to users of the messaging platform 100.

A content provider associated with the identifier may receive the message from the messaging platform 100 and perform an action on the message. In one or more embodiments, the messaging platform 100 may include functionality to receive promotion criteria from the content provider. Promotion criteria may include messages to be promoted, target audiences, targeting criteria, or a spend amount. For example, the messaging platform 100 may provide a console interface in which the content provider can provide the promotion criteria. In some examples, the identifier may be relatively generic, and targeting data, such as target audiences and targeting criteria, may be used to provide promoted content items to a desired set of users. In one or more embodiments, the action may include "liking" or "favoriting" the message, a sharing of the message, and/or a comment on the message. The content promotion module 120 may receive the action from the content provider performed on the message from the user and promote the message and/or the user who submitted the message accordingly. Promotion of the message and/or user may include adjusting metrics of the ranking criteria to present the message and/or other messages of the user more frequently, higher in a list of messages broadcast to users of the messaging platform 100, or to user accounts outside of a predefined graph relationship with an account of the content provider.

In one or more embodiments, the content promotion module 120 selects identifiers and/or content items to associate with those identifiers on behalf of the content provider. In a hybrid approach, the content promotion module 120 receives a set of identifiers selected or approved by the content provider and then selects specific associations with any subset of those identifiers, in accordance with targeting information and spend limits or other budgetary restrictions of the content provider.

In one or more embodiments, a user of a client computing device 201 may submit a message including a content item. The user or another user may include an identifier associating the content item with the identifier. The content promotion module 120 may receive the content item and the association of the content item with the identifier to include the content item as a content item associated with the identifier. The content item may be an unsponsored content item.

Figures 5A, 5B:
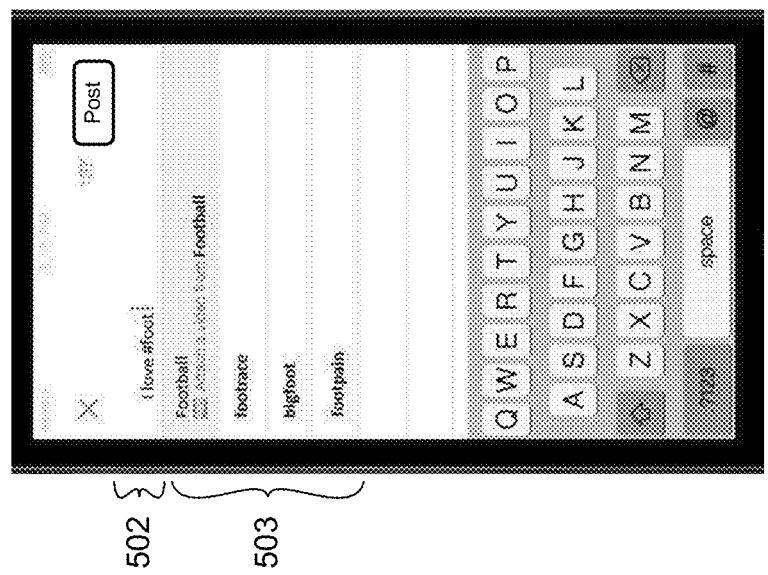

FIG. 5A-5E show example user interfaces in accordance with one or more embodiments. A client computing device 501 of FIGS. 5A-5E may be the same as or similar to the client computing device 105 of FIG. 1A. In one or more embodiments, as shown in FIG. 5A, the client computing device 501 includes functionality to present a message composition user interface element 502. In one or more embodiments, the client computing device 501 includes functionality to present an identifier-suggestion user interface element 503 configured to provide a set of identifier suggestions during composition of the message.

For example, the client computing device 501 may send the contents of a message, while it is being composed by a user, to the messaging platform. The client computing device 501 may receive, from the messaging platform, identifier suggestions based partially or fully on the contents of the message being composed. The identifier suggestions may be selected based on a predictive association, related identifiers, and/or other relevant identifiers. The user may select an identifier suggestion to include the selected identifier during composition of the message. In one or more embodiments, as shown in FIG. 5B, the client computing device 501 includes functionality to present a set of content items 504 of the content provider associated with the selected identifier.

In one or more embodiments, as shown in FIG. 5B, the client computing device 501 includes functionality to present the set of content items 504 in a user interface element including a preview element configured to display a preview of one or more of the set of content items 504. The user interface element may be presented concurrently during composition of a message. In one or more embodiments, the preview element may be expanded to a full screen view or to occupy a larger portion of a screen of the client computing device 501. In one or more embodiments, the preview includes a display, playback, and/or output of the one or more content items. In one or more embodiments, as shown in FIG. 5C, the preview may be played back using initiating playback user interface element 506. In one or more embodiments, as shown in FIG. 5D, the preview may be stopped using a stopping user interface element 507. In one or more embodiments, as shown in FIG. 5E, the client computing device 501 includes functionality to receive a selection of a content item 505 from a user of the client computing device 501 and to provide a message 508 including a reference to the selected content item 505. In one or more embodiments, the client computing device 501 includes functionality to provide the message 508 to the messaging platform 100 for broadcast to a set of accounts of the messaging platform 100.

In one or more embodiments, the winning content provider may be a first winning content provider. In one or more embodiments, the content promotion module 120 includes functionality to determine, based on the set of auction criteria, a second winning content provider. The first winning content provider and the second winning content provider may both provide content associated with the identifier. The first winning content provider and the second winning content provider may be competitors. In one or more embodiments, the set of content items includes content from the first winning content provider and the second winning content provider. It will be understood that any number of winning content providers may be determined based on the set of auction criteria. In one or more embodiments, winning content providers may be ranked with respect to one another. The ranking of winning content providers may be based on the set of auction criteria or another set of criteria for winning content providers.

In one or more embodiments, the content promotion module 120 may include functionality to associate a set of content providers with the identifier. In one or more embodiments, the content promotion module 120 may include functionality to associate the set of content items with at least two of the set of content providers. The set of content providers may include winning content providers and/or other content providers. Thus, the set of content items of the content providers associated with the identifier may include content items associated with winning content providers and/or content items associated with other content providers. Content items from other content providers may be provided along with content items from the winning content providers in the set of content items presented to the user of the client computing device 105. One or more weighting criteria may be used to determine the order in which a set of content items including content from winning and other content providers may be sorted and/or ultimately presented by a client computing device. For example, when content items from multiple content providers are determined to be associated with an identifier, content items of other content providers may be presented simultaneously with but below content items of a winning content provider.

In one or more embodiments, the content promotion module 120 includes functionality to broadcast the message with a reference to the selected content item to a set of accounts of the messaging platform 100. The message may be included in a message stream of each account. The set of accounts that receive the message from the messaging platform 100 may view the selected content item. For example, a user of the messaging platform 100 may interact with a user interface element provided with the message. The user interface element may include functionality to allow the user to interact with the user interface element. For example, the user interface may include a preview element that allows previewing of the content, a drag and drop element that allows attachment of a file, a move element that allows moving of the user interface element, or form fields that may receive user input. A message stream may include content broadcasted by or engaged with by accounts having a predefined graph relationship with the context account in the connection graph. Examples of engagement between user accounts can include, but are not limited to, a number of rebroadcasts of the authoring account's messages by the context account, a number of favorites/likes of the authoring account's messages by the context account, a number of responses to the authoring account's messages by the context account, a number of mentions or references of the authoring account's messages by the context account, a number of followers/connections/friends of the authoring account within the context account's connection graph, an indication that the authoring account is a favorite account by the context account, prior engagement with a conversation between the authoring account and the context account, and/or an amount of any other activity associated with one or more unviewed messages.

In one or more embodiments, the client computing device 501 includes functionality to present the set of content items during composition of the message. In one or more embodiments, the set of content items are sorted and presented in an order based on ranking criteria. In one or more embodiments, providing the set of content items may include ranking a set of candidate content items according to the ranking criteria and selecting, based on ranking the set of candidate content items, the set of content items from the set of candidate content items. In some examples, the ranking criteria may determine a relevance of each of the set of content items to an identifier. The ranking criteria may be based on, for each of the set of content items, a recency of the content item, a frequency of viewing the content item by users of the messaging platform 100, engagement with the content item by users of the messaging platform 100, a geographical proximity between a location of the client computing device 105 and a location associated with the content item, ownership of the identifier, and/or a relevance of the content item. In some examples, the relevance of the content item may be determined based on recency, size, and/or popularity. For example, the list of suggested content items may be in strict reverse chronological order (in order of recency) or may be weighted by recency in addition to other criteria.

In one or more embodiments, ranking the set of content items includes weighting a ranking score associated with each content item based on one or more weighting criteria. The ranking of the set of content items may provide higher ranked content items above lower ranked content items when presented by the client computing device 105. In one or more embodiments, the set of content items is ranked and a subset of the highest ranking content items is selected for presentation by the client computing device 105. In one or more embodiments, the weighting criteria are based on weighting preferences provided by the content provider. For example, the content promotion module 120 may receive promotion criteria from the content provider to define weighting preferences. The weighting preferences may include geographic parameters, target audience parameters, and spend amount limits. In one or more embodiments, the weighting criteria may be automatically determined by metrics associated with each content item, including number of views, popularity, age, and geographical proximity to the user. For example, a content item with a higher number of views may be ranked higher than a content item with a lower number of views.

In one or more embodiments, the content promotion module 120 includes functionality to provide an unsponsored set of content items not associated with the content provider for presentation by the client computing device 105. The unsponsored set of content items may be provided using relevancy criteria to determine the relevancy of content items to the identifier. The relevancy of each content provider to the identifier may be determined by evaluating geographic relevance, subject matter relevance, or previous association of the identifier to a content provider by users of the messaging platform 100. In one or more embodiments, ranking criteria for the set of content items is different from ranking criteria for the unsponsored set of content items. For example, the ranking criteria for the set of content items may provide it with a higher rank than the set of unsponsored set of content items when all other metrics are the same.

In one or more embodiments, the content promotion module 120 includes functionality to provide content or a container for performing an action. The container may include executable code or a script of the messaging platform 100 or a third party. For example, the action may include informing users of the messaging platform 100 that a user has behaved a certain way on an external platform (e.g., that the user has "liked" another user's photo), accepting a vote, and initiating a financial transaction. During composition of a message, the content promotion module 120 may detect an identifier associated with the container and may present the container to the client computing device 105. The container may include a reference to a message of the messaging platform 100 and/or a reference to third party content.

In one or more embodiments, the content promotion module 120 includes functionality to initiate a financial transaction with a server in response to the selection of the content item associated with the content provider. The financial transaction may include a sale of a product and/or a sale of a service. In one or more embodiments, products may include services. In one or more embodiments, the content promotion module 120 may include functionality to add a selected item to a shopping cart. The content promotion module 120 may provide a reference to a third party server to complete the financial transaction for the selected item previously added to the shopping cart. In one or more embodiments, the content promotion module 120 may initiate the financial transaction by providing fields configured to receive, from the user of the client computing device 105, user input related to payment information. The client computing device 105 may present the fields in a user interface element such that a user may enter payment information that the client computing device 105 may transmit to the content promotion module 120.

In one or more embodiments, the content promotion module 120 may initiate the financial transaction by providing fields configured to receive, from the user of the client computing device 105, user input related to account information associated with the content provider. The client computing device 105 may present the fields in a user interface element such that a user may enter account information that the client computing device 105 may transmit to the content promotion module 120. The content promotion module 120 may authenticate the account information or transmit the account information to a third party for verification. In one or more embodiments, the content promotion module 120 may initiate the financial transaction by providing a user interface element configured to display a product offered for sale by the content provider. The client computing device 105 may present the user interface element such that a user may view the product offered for sale by the content provider and proceed with the financial transaction.

In one or more embodiments, the content promotion module 120 includes functionality to initiate a voting session with a server in response to the selection of the content item associated with the content provider. The voting session may include a vote for users' opinions, preferences, product ratings, and/or other types of selections or rankings by users. In one or more embodiments, the content promotion module 120 may include functionality to add a selected item to a balloting container associated with the voting session. The selected item may represent a vote or a ranking by the user. The content promotion module 120 may provide a reference to a third party server to complete the voting session for the previously selected item. In one or more embodiments, the content promotion module 120 may initiate the voting session by providing fields including functionality to receive, from the user of the client computing device 105, user input related to a vote, selection, and/or ranking The client computing device 105 may present the fields in a user interface element such that a user may make their selection, such that the client computing device 105 may transmit to the content promotion module 120.

In one or more embodiments, the content promotion module 120 includes functionality to perform analytics with a server in response to the selection of the content item associated with the content provider. The analytics may include a logging the selections of the user, geographical data of the user, time spent viewing the set of content items before making a selection, and/or other actions of the user after being presented with the set of content items. In one or more embodiments, the content promotion module 120 may include functionality to transmit logged selections to a third party server to perform analytics. The third party server may be an internal server of the messaging platform 100 or an external server outside of the messaging platform 100. The content promotion module 120 may provide a reference to the third party server to perform analytics related to the selected content item. In one or more embodiments, the content promotion module 120 may receive analytics related to the selected content item from the third party server. The content promotion module 120 may use the received analytics as part of the ranking criteria for presenting content items to users of the messaging platform 100.

Figure 6:
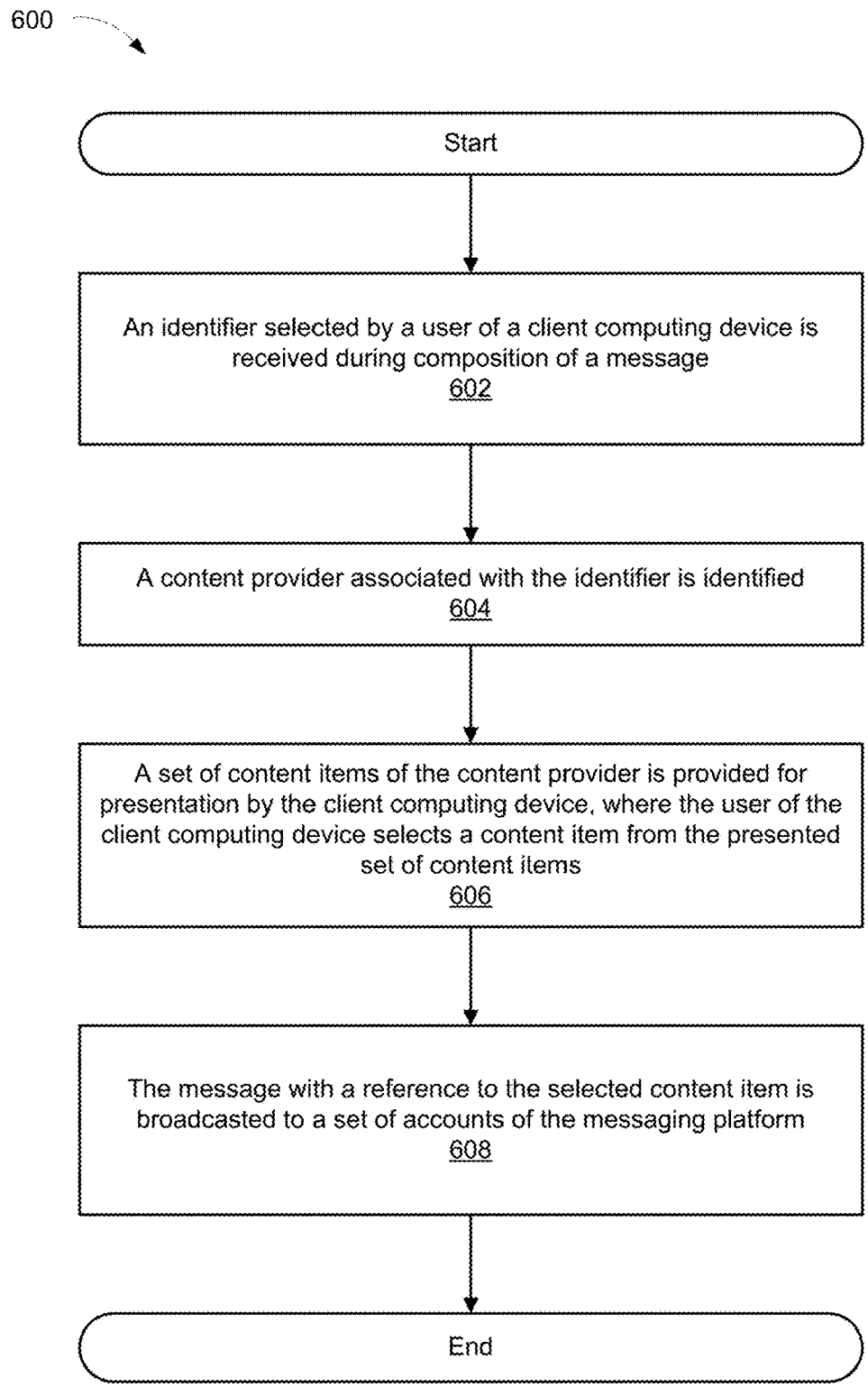
FIG. 6 shows a flowchart for providing content for broadcast by a messaging platform in accordance with one or more embodiments of the invention.

FIG. 6 shows a flowchart 600 for providing content for broadcast by a messaging platform in accordance with one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6 should not be construed as limiting the scope of the invention.

In Step 602, an identifier selected by a user of a client computing device is received in accordance with one or more embodiments. In one or more embodiments, the identifier may include a hashtag, a handle, and/or a button on a profile page. In one or more embodiments, suggestions for an identifier may be provided using keywords from the message.

In Step 604, a content provider associated with the identifier is identified in accordance with one or more embodiments. The identifier may be identified by using a known prefix, string of characters, or user interface element. The composition of a message may be continuously monitored, monitored at predefined time intervals, and/or monitored at each character input.

In Step 606, a set of content items of the content provider is provided for presentation by the client computing device, where the user of the client computing device selects a content item from the presented set of content items in accordance with one or more embodiments. The set of content items may be received from the messaging platform. For example, the set of content items may be received from a content promotion repository. In one or more embodiments, the set of content items includes images, video, audio, or text. It will be understood that the set of content items 204 may include any combination of images, video, audio, and text. Moreover, the set of content items 204 may include other types of content items.

In Step 608, the message with a reference to the selected content item is broadcasted to a set of accounts of the messaging platform. A message stream may include content broadcasted by or engaged with by accounts having a predefined graph relationship with the context account in the connection graph.

Figure 7:
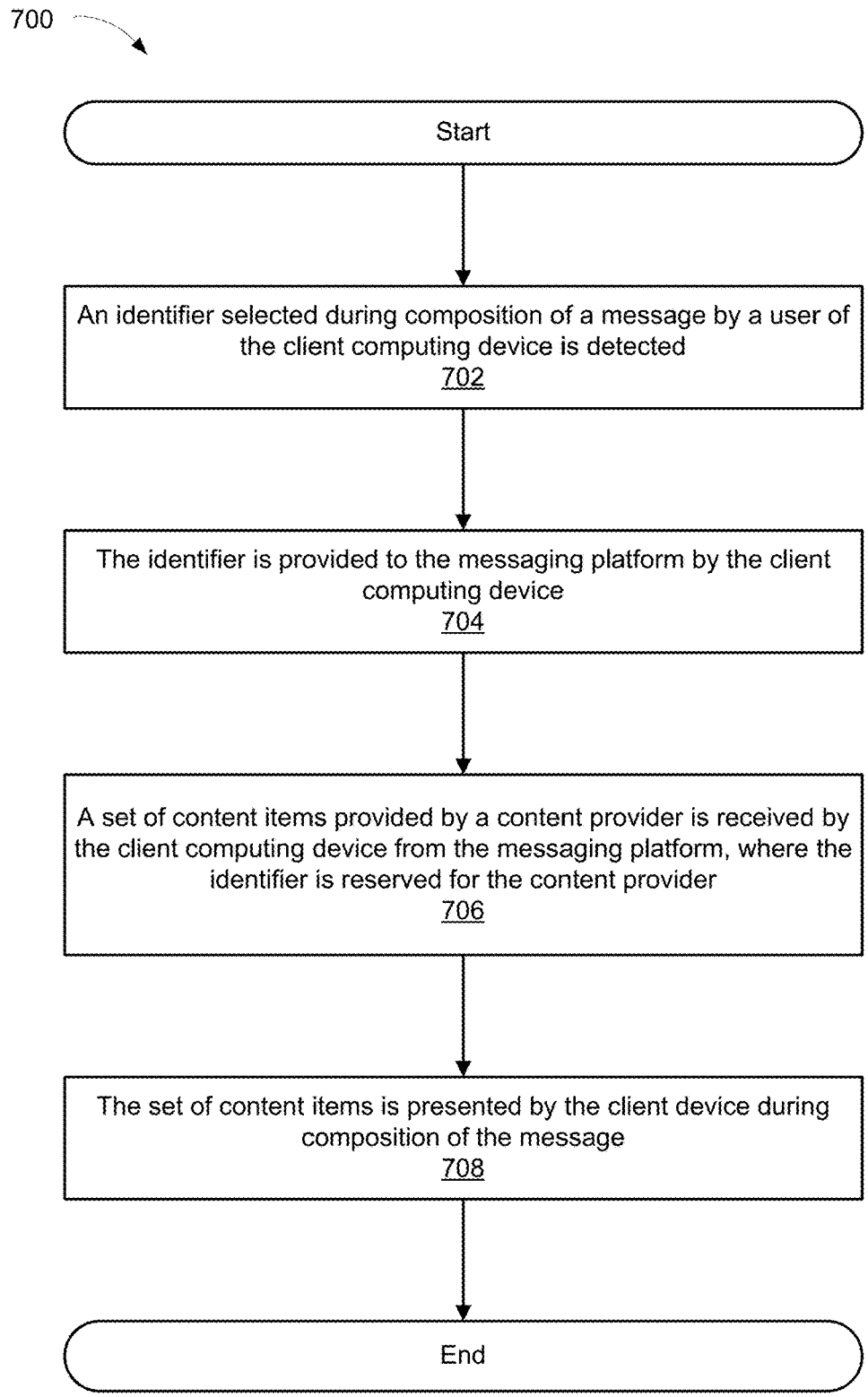
FIG. 7 shows a flowchart for presenting content in accordance with one or more embodiments of the invention.

FIG. 7 shows a flowchart 700 for presenting content in accordance with one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7 should not be construed as limiting the scope of the invention.

In Step 702, an identifier selected during composition of a message by a user of the client computing device is detected. The identifier may be detected by using a known prefix, string of characters, or user interface element. The composition of a message may be continuously monitored, monitored at predefined time intervals, and/or monitored at each character input. In one or more embodiments, the identifier may be manually selected by the user.

In Step 704, the identifier is provided to the messaging platform by the client computing device. The client computing device may be in communication with the messaging platform to provide the messaging platform with data related to the message, including message content, identifiers, and/or handles. In one or more embodiments, the identifier may be provided to the messaging platform when the message is submitted to the messaging platform. In one or more embodiments, the identifier may be provided to the messaging platform after detection but before the message is submitted. In one or more embodiments, suggestions for identifiers and/or content items may be provided to the client computing device during composition of the message using the identifier provided by the client computing device.

In Step 706, a set of content items provided by a content provider is received by the client computing device from the messaging platform, where the identifier is reserved for the content provider. When an identifier is reserved for the content provider, the content provider may be the primary source or the only source of content for the reserved identifier. An identifier may be reserved by the messaging platform by a variety of mechanisms including manually reserving, facilitating an auction, using ranking criteria.

In Step 708, the set of content items is presented by the client computing device during composition of the message. Content items received by the client computing device may be presented to the user of the client computing device in a user interface element. In one or more embodiments, the user may perform an action on the user interface element. For example, the user may select a content item for insertion into a composition of a message, preview a content item, or enter data into a field of a content item.

The following is an example of one or more embodiments. For the following example, consider the scenario in which a popular football game is being televised live. Many viewers of the football game are users of the messaging platform and are engaged with one another using the messaging platform. A first user from a first location may communicate their interest in the football game by using an identifier associated with the football game, such as "#footballplayoffs". During composition of a message, the first user may search for an identifier associated with the popular football game by typing "#football". The messaging platform may receive this partial input of the identifier and suggest identifiers based on a predictive algorithm. The messaging platform may determine the suggestions using ranking criteria. One of the suggestions may be "#footballplayoffs", which may have been determined to be globally relevant to a message containing the word "football". Another suggestion may be an identifier referencing the first user's local sports team, such as "#footballteam1", which the messaging platform may have determined based on an evaluation of geographical proximity between the first location and a geographical association of the identifier. The first user may select "#footballplayoffs" from a list of suggestions for identifiers. The first user may then be presented with content items associated with the identifier. A content provider may have previously won an auction for "#footballplayoffs". The content items of the content provider may be at the top of the list of content items presented to the first user during composition of the message. The first user may preview any of the content items presented. The first user may select a content item from the list of content items presented. The selected content item may be included in the message. The first user may submit the message to the messaging platform for broadcast to users of the messaging platform.

Continuing with the previous example, a second user from a second location may communicate their interest in the football game by using an identifier associated with the football game, such as "#footballplayoffs". During composition of a message, the second user may search for an identifier associated with the popular football game by typing "#football". The messaging platform may receive this partial input of the identifier and suggest identifiers based on a predictive algorithm. Similar to the first user, one of the suggestions presented to the second user may be "#footballplayoffs", which the messaging platform may have determined to be globally relevant to a message containing the word "football". Another suggestion may be an identifier referencing the second user's local sports team, such as "#footballteam2", which the messaging platform may have determined based on an evaluation of geographical proximity between the second location and a geographical association of the identifier. The second user may select "#footballteam2" from a list of suggestions for identifiers. The second user may then be presented with content items associated with the identifier. A content provider may have previously won an auction for "#footballteam2". The content items of the content provider may be at the top of the list of content items presented to the second user during composition of the message. The second user may preview any of the content items presented. The second user may select a content item from the list of content items presented. The selected content item may be included in the message. The second user may submit the message to the messaging platform for broadcast to users of the messaging platform.

Continuing with the previous example, a third user from a third location may communicate their interest in football by using key words associated with football, such as "football". During composition of a message, the third user may type "football". The messaging platform may receive this input and suggest identifiers based on a predictive algorithm. One of the suggestions presented to the third user may be "#footballplayoffs", which the messaging platform may have determined to be a promoted identifier relevant to a message containing the word "football". A content provider may be a winner of an auction for "#footballplayoffs" and may have designated "football" as a key word. Another suggestion may be an identifier referencing the third user's local sports team, such as "#footballteam3", which the messaging platform may have determined based on an evaluation of geographical proximity between the third location and a geographical association of the identifier. Another suggestion may be an identifier referencing a player on the third user's local sports team, such as "#footballer", which the messaging platform may have determined based on relevancy to "football". The "#footballer" identifier may not be a promoted identifier. The third user may select "#footballer" from a list of suggestions for identifiers. Although "#footballer" is not a promoted identifier, the messaging platform may determine that "#footballer" is relevant to "#footballplayoffs". The third user may then be presented with content items associated with the "#footballplayoffs". The content items of the winning content provider may be at the top of the list of content items presented to the third user during composition of the message. The third user may preview any of the content items presented. The third user may select a content item from the list of content items presented. The selected content item may be a content item associated with the content provider that was the winner of the auction for "#footballplayoffs". The selected content item may be included in the message. The third user may submit the message to the messaging platform for broadcast to users of the messaging platform.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Embodiments of the invention may be implemented on virtually any type of computing system regardless of the platform being used. Examples of such a computing system can include one or more mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 8:
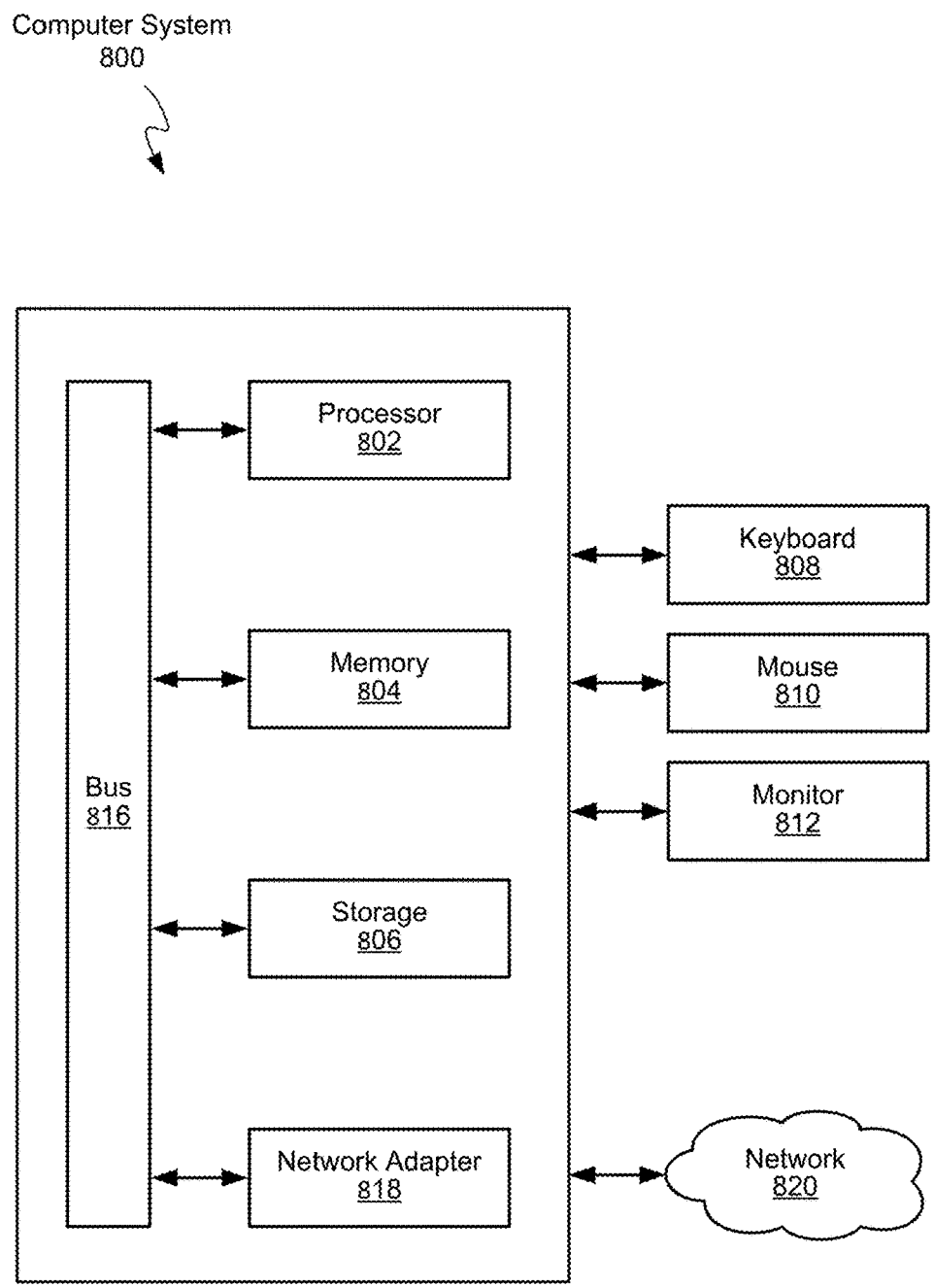
FIG. 8 shows a computer system in accordance with one or more embodiments of the invention.

For example, as shown in FIG. 8, the computing system 800 may include one or more computer processor(s) 802, associated memory 804 (e.g., random access memory (RAM), cache memory, flash memory, etc.), one or more storage device(s) 806 (e.g., a hard disk, an optical drive such as a compact disk (CD) drive or digital versatile disk (DVD) drive, a flash memory stick, etc.), a bus 816, and numerous other elements and functionalities. The computer processor(s) 802 may be an integrated circuit for processing instructions. For example, the computer processor(s) may be one or more cores or micro-cores of a processor. The computing system 800 may also include one or more input device(s), such as a touchscreen, keyboard 808, mouse 810, microphone, touchpad, electronic pen, or any other type of input device. Further, the computing system 800 may include one or more output device(s) 812, such as a screen (e.g., a liquid crystal display (LCD), a plasma display, touchscreen, cathode ray tube (CRT) monitor, projector, or other display device), a printer, external storage, or any other output device. The computing system 800 may be connected to a network 820 (e.g., a local area network (LAN), a wide area network (WAN) such as the Internet, mobile network, or any other type of network) via a network interface connection 818. The input and output device(s) may be locally or remotely connected (e.g., via the network 820) to the computer processor(s) 802, memory 804, and storage device(s) 806.

One or more elements of the aforementioned computing system 800 may be located at a remote location and connected to the other elements over a network 820. Further, embodiments may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIG. 1A) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIG. 1A) and/or flowcharts (e.g., FIGS. 6 and 7). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While the invention has been described with respect to a limited number of embodiments, those skilled in the art, having benefit of this disclosure, will appreciate that other embodiments may be devised which do not depart from the scope of the invention as disclosed herein.

What is claimed is:
1. A method comprising:
assigning one or more identifiers of a plurality of identifiers to each of a plurality of content provider accounts of a messaging platform;
receiving promotion criteria from the plurality of content provider accounts;
prior to receiving an indication that a user of the messaging platform has completed composition of a message:
receiving, from a client computing device, a portion of a message entered by a user of the messaging platform during composition of a message;

determining one or more identifiers based on the received portion of the message, each identifier corresponding to one or more content provider accounts of the plurality of content provider accounts;

providing the one or more identifiers for presentation in an interface of the client computing device;

receiving a user selection of an identifier of the one or more identifiers;

in response to the user selection of the identifier corresponding to one or more content provider accounts:

obtaining a plurality of content items authored by the one or more content provider accounts, and ranking the plurality of content items according to one or more ranking criteria, wherein the one or more ranking criteria comprise one or more promotion criteria previously provided by the one or more content providers;

providing to the client computing device a set of content items for ordered presentation by the client computing device during composition of the message according to the ranking; and receiving, from the client computing device, a selection of a content item of the presented set of content items, wherein the selection is made by the user prior to completing composition of the message;

receiving the indication that the user has completed composition of the message; and broadcasting the message and the selected content item to a plurality of accounts of the messaging platform.

2. The method of claim 1, wherein the one or more ranking criteria are based on, for each of the plurality of content items, at least one selected from a group consisting of:

a recency of the content item, a frequency of viewing the content item by users of the messaging platform, engagement with the content item by users of the messaging platform, and a geographical proximity between a location of the client computing device and a location associated with the content item.

3. The method of claim 1, wherein ranking the plurality of content items further comprises weighting a ranking score associated with each content item based on at least one weighting criterion, wherein the weighting criterion is based on weighting preferences associated with the content provider account.

4. The method of claim 1, further comprising initiating a financial transaction with a server in response to the selection of the content item associated with the content provider account, wherein initiating the financial transaction comprises providing at least one selected from a group consisting of:

fields configured to receive, from the user of the client computing device, user input related to payment information;

fields configured to receive, from the user of the client computing device, user input related to account information associated with the content provider account; and a user interface element configured to display a product offered for sale by the content provider account.

5. The method of claim 1, further comprising providing an unsponsored set of content items for presentation, concurrently with the set of content items, by the client computing device during composition of the message, wherein:

the unsponsored set of content items are not associated with the one or more content provider accounts; and the one or more ranking criteria for the set of content items are different from ranking criteria for the unsponsored set of content items.

6. The method of claim 1, wherein the set of content items comprises at least one selected from a group consisting of images, video, audio, and text.

7. The method of claim 1, further comprising:

facilitating an auction for the identifier;

receiving a plurality of bids for a plurality of content provider accounts in response to the auction, the plurality of content provider accounts comprising the content provider account; and determining, based on a plurality of auction criteria, that the content provider account is a winner of the auction.

8. The method of claim 7, wherein the plurality of auction criteria comprises a relevance criterion based on a relevance of each of the plurality of content provider accounts to the identifier and a monetary criterion based on the bid provided by each of the plurality of content provider accounts.

9. The method of claim 7, further comprising:

determining, based on the plurality of auction criteria, a second winning content provider account, wherein the set of content items comprises content from the content provider account and the second winning content provider account.

10. The method of claim 1, wherein the one or more promotion criteria previously received from the one or more content providers are based on, for each of the set of content items, at least one selected from a group comprising:

an indication that the content item is preferred by a respective content provider account authoring the content item over other content items authored by the content provider account, one or more targeted accounts present or absent in a plurality of other accounts of the messaging platform, and characteristics of the plurality of other accounts according to a predetermined targeting criterion.

11. A system, comprising:

a computer processor;

a content promotion module executing on the computer processor and configured to enable the computer processor to:

assign one or more identifiers of a plurality of identifiers to each of a plurality of content provider accounts of a messaging platform;

receive promotion criteria from the plurality of content provider accounts;

prior to receiving an indication that a user of the messaging platform has completed composition of a message:

receive, from a client computing device, a portion of a message entered by a user of the messaging platform during composition of a message;

determine one or more identifiers based on the received portion of the message, each identifier corresponding to one or more content provider accounts of the plurality of content provider accounts;

provide for presentation in an interface of the client computing device;

receive a user selection of an identifier of the one or more identifiers;

in response to the user selection of the identifier corresponding to one or more content provider accounts:

obtain a plurality of content items authored by the one or more content provider accounts, and rank the plurality of content items according to one or more ranking criteria, wherein the one or more ranking criteria comprise one or more promotion criteria previously provided by the one or more content providers;

provide a set of content items for ordered presentation by the client computing device during composition of the message according to the ranking; and receive, from the client computing device, a selection of a content item of the presented set of content items, wherein the selection is made by the user prior to completing composition of the message;

receive the indication that the user has completed composition of the message; and broadcast the message and the selected content item to a plurality of accounts of the messaging platform.

12. The system of claim 11, wherein the content promotion module is further configured to enable the computer processor to:

provide an unsponsored set of content items for presentation, concurrently with the set of content items, by the client computing device during composition of the message, wherein the unsponsored set of content items are not associated with the content provider account, and wherein ranking criteria for the set of content items is different from ranking criteria for the unsponsored set of content items.

13. The system of claim 11, wherein the one or more promotion criteria previously received from the one or more content providers are based on, for each of the set of content items, at least one selected from a group comprising:

an indication that the content item is preferred by a respective content provider account authoring the content item over other content items authored by the content provider account, one or more targeted accounts present or absent in a plurality of other accounts of the messaging platform, and characteristics of the plurality of other accounts according to a predetermined targeting criterion.

14. The system of claim 11, wherein the one or more ranking criteria are based on, for each of the plurality of content items, at least one selected from a group consisting of:

a recency of the content item, a frequency of viewing the content item by users of the messaging platform, engagement with the content item by users of the messaging platform, and a geographical proximity between a location of the client computing device and a location associated with the content item.

15. The system of claim 11, wherein ranking the plurality of content items further comprises weighting a ranking score associated with each content item based on at least one weighting criterion, wherein the weighting criterion is based on weighting preferences associated with the content provider account.

16. The system of claim 11, wherein the content promotion module is further configured to enable the computer processor to:

initiate a financial transaction with a server in response to the selection of the content item associated with the content provider account, wherein initiating the financial transaction comprises providing at least one selected from a group consisting of:

fields configured to receive, from the user of the client computing device, user input related to payment information, fields configured to receive, from the user of the client computing device, user input related to account information associated with the content provider account, and a user interface element configured to display a product offered for sale by the content provider account.

17. The system of claim 11, wherein the content promotion module is further configured to enable the computer processor to:

facilitate an auction for the identifier;

receive a plurality of bids for a plurality of content provider accounts in response to the auction, the plurality of content provider accounts comprising the content provider account; and determine, based on a plurality of auction criteria, that the content provider account is a winner of the auction.

18. One or more non-transitory computer-readable storage media encoded with instructions that, when executed by one or more computers, cause the one or more computers to perform operations comprising:

assigning one or more identifiers of a plurality of identifiers to each of a plurality of content provider accounts of a messaging platform;

receiving promotion criteria from the plurality of content provider accounts;

prior to receiving an indication that a user of the messaging platform has completed composition of a message:

receiving, from a client computing device, a portion of a message entered by a user of the messaging platform during composition of a message;

determining one or more identifiers based on the received portion of the message, each identifier corresponding to one or more content provider accounts of the plurality of content provider accounts;

providing the one or more identifiers for presentation in an interface of the client computing device;

receiving a user selection of an identifier of the one or more identifiers;

in response to the user selection of the identifier corresponding to one or more content provider accounts:

obtaining a plurality of content items authored by the one or more content provider accounts, and ranking the plurality of content items according to one or more ranking criteria, wherein the one or more ranking criteria comprise one or more promotion criteria previously provided by the one or more content providers;

providing to the client computing device a set of content items for ordered presentation by the client computing device during composition of the message according to the ranking; and receiving, from the client computing device, a selection of a content item of the presented set of content items, wherein the selection is made by the user prior to completing composition of the message;

receiving the indication that the user has completed composition of the message; and broadcasting the message and the selected content item to a plurality of accounts of the messaging platform.

19. The computer-readable storage media of claim 18, wherein the one or more promotion criteria previously received from the one or more content providers are based on, for each of the set of content items, at least one selected from a group comprising:
- an indication that the content item is preferred by a respective content provider account authoring the content item over other content items authored by the content provider account,
- one or more targeted accounts present or absent in a plurality of other accounts of the messaging platform, and
- characteristics of the plurality of other accounts according to a predetermined targeting criterion.

20. The computer-readable storage media of claim 18, wherein the one or more ranking criteria are based on, for each of the plurality of content items, at least one selected from a group consisting of:
- a recency of the content item,
- a frequency of viewing the content item by users of the messaging platform, engagement with the content item by users of the messaging platform, and
- a geographical proximity between a location of the client computing device and a location associated with the content item.

\* \* \* \* \*